(12) United States Patent
Mostafa et al.

(10) Patent No.: US 6,381,290 B1
(45) Date of Patent: Apr. 30, 2002

(54) MOBILE UNIT FOR PILOT SYMBOL ASSISTED WIRELESS SYSTEM AND METHOD OF IMPROVING PERFORMANCE THEREOF

(75) Inventors: Ayman Mostafa; Rajaram Ramesh, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/094,140

(22) Filed: Jun. 9, 1998

Related U.S. Application Data

(60) Provisional application No. 60/085,769, filed on May 15, 1998.

(51) Int. Cl.⁷ .............................................. F04B 17/00
(52) U.S. Cl. .................................. 375/350; 455/63
(58) Field of Search ................................ 375/267, 340, 375/343, 346, 347, 350, 285; 455/63, 67.6; 708/313, 300

(56) References Cited

U.S. PATENT DOCUMENTS

| | | | |
|---|---|---|---|
| 4,723,303 A | | 2/1988 | Koch ........................ 455/67 |
| 5,016,017 A | | 5/1991 | Kodera et al. ............ 342/106 |
| 5,481,270 A | * | 1/1996 | Urkowitz et al. .......... 342/101 |
| 5,586,148 A | * | 12/1996 | Furukawa et al. ......... 375/340 |
| 5,602,507 A | * | 2/1997 | Suzuki ..................... 329/304 |
| 5,764,102 A | * | 6/1998 | Cochran et al. .......... 329/304 |
| 5,881,110 A | * | 3/1999 | Cochran ................... 375/324 |
| 5,943,606 A | * | 8/1999 | Kremm et al. ........... 455/12.1 |
| 6,058,306 A | * | 5/2000 | Liu .......................... 455/427 |

OTHER PUBLICATIONS

Wen-yi Kuo et al, "Designs for Pilot–Symbol–Assisted Burst–Mode Communications with Fading and Frequency Uncertainty", *International Journal of Wireless Information Networks*, vol. 1, No. 4, 1994, pp. 239–252.

* cited by examiner

*Primary Examiner*—Jean Corrielus
(74) *Attorney, Agent, or Firm*—Coats & Bennett, P.L.L.C.

(57) ABSTRACT

A mobile unit for communicating with a transmitter which transmits signals in data bursts, such data bursts having a plurality of symbols therein including data symbols and a plurality of predetermined pilot symbols. The symbols have a discrete number of possible values. The unit further includes a receiver adapted to receive a data burst of the transmitted signals, memory with the predetermined pilot symbols and a plurality of signal filters, a comparator, a processor, and an output. The comparator compares the pilot symbols in a received data burst with the predetermined pilot symbols in the memory to determine correction factors for the pilot symbols. The processor uses the pilot symbol correction factors and the plurality of signal filters to derive a set of data symbol correction factors for each of the signal filters. The processor also adjusts discrete possible values of the data symbols by the data symbol correction factors and compares those adjusted values with the received data symbols to determine a cumulative error value among adjusted data symbols for each signal filter. The processor uses the data symbols derived by the signal filter having the lowest cumulative error value to demodulate a received data burst.

17 Claims, 2 Drawing Sheets

MOBILE UNIT FOR PILOT SYMBOL ASSISTED WIRELESS SYSTEM AND METHOD OF IMPROVING PERFORMANCE THEREOF

RELATED APPLICATION

Priority is claimed in U.S. Provisional Application No. 60/085,769 entitled "Mobile Unit for Pilot Symbol Assisted Wireless System and Method of Improving Performance Thereof", Ayman Mostafa and Rajaram Ramesh, filed May 15, 1998.

BACKGROUND OF THE INVENTION

1. Technical Field

The present invention is directed toward communication systems, and more particularly toward pilot symbol assisted wireless systems.

2. Background Art

Signals for wireless systems are subjected to varying conditions which can degrade the signal received by the mobile units using the system.

For example, a mobile unit can receive the signal from multiple directions (e.g., directly from the base unit, and reflected off of many different ground objects), with the varying signal sources potentially being out of phase and thereby tending to cancel each other out to some degree, reducing signal strength. Such signal fading, generally known as Rayleigh fading, occurs spatially over the area of the system, with specific areas potentially having significant fading which could cause the mobile unit to lose the signal entirely.

Still further, mobile units are subject to the Doppler effect as they move about the system. As is known in the art, whenever relative motion exists between the signal source/transmitter and signal recipient/receiver, there is a Doppler shift of the frequency components of the received signal. Thus, where the recipient is in a vehicle moving at a speed v, the maximum Doppler shift frequency $f_d$ (occurring when the vehicle is moving directly at or directly away from the signal source) is:

$$f_d = v/\lambda$$

Component waves arriving from ahead of the vehicle experience a positive Doppler shift (i.e., the frequency increases) while those arriving from behind the vehicle have a negative shift (i.e., the frequency decreases). Thus, if a vehicle is traveling 60 km/hr, at 900 MHz ($\lambda \sim 0.33$ m) the maximum Doppler shift (when the vehicle is traveling directly toward or away from the signal source) is:

$$f_d = [60,000 \text{ m/hr}/3600 \text{ sec/hr}]/0.33 \text{ m} = 50 \text{ Hz}$$

Of course, a proportional change in frequency, or speed, would produce a proportional change in $f_d$. This shift in frequency results in the maximum signal strength being at the shifted frequency rather than the assigned frequency, with the signal strength being significantly less at the assigned frequency (as perceived by the moving mobile unit) which is demodulated by the mobile unit. If the mobile unit happens to also pass through an area in the system subjected to significant Rayleigh fading, a significant loss in signal strength can accordingly result.

In any event, the net result of these and other factors is that the signal which is transmitted by the transmitter (e.g., a cell tower) will be distorted by the time it reaches the receiver (e.g., cellular telephone). In a cellular telephone, for example, this can result in distortion objectionable to the ear, or even a lost signal.

In order to account for this distortion, channel estimates have been used to determine the signal distortion at known pilot symbols in the data bursts and correction factors at other symbols in the data bursts have been interpolated based on the channel estimates at the pilot symbols. As an example, data bursts have been transmitted in the IS-136 System with 162 symbols, each symbol comprising two bits. In a proposed extension of the IS-136 System, the data bursts of 162 symbols at predetermined, known locations $P_i$ in the data bursts are predetermined, known pilot symbols $S_{Pi}$ (where i =1 to n, n being the number of pilot symbols used). In the proposed extension of the IS-136 System, each symbol contains three bits.

As also described further below, the correction factors (i.e., channel estimates) derived from the pilot symbols can be used to estimate the most likely value for each data symbol in a data burst. That is, the channel estimates derived from the pilot symbols may be interpolated to determine the correction factors at the other symbols (i.e., data symbols) in the data burst by using an interpolator or filter selected to best work under the conditions most likely to be encountered by the communication unit. In order to provide acceptable performance, such interpolator or filter essentially needs to be designed so as to handle the highest possible vehicle speed. For example, an interpolator or filter designed to accommodate a Doppler effect encountered at 60 kph will not provide acceptable performance for a vehicle traveling at 70 kph toward or away from the cell tower). Unfortunately, this has unavoidably resulted in required use of an interpolator or filter which causes degradation in the estimation of symbols which are received under conditions other than those parameters upon which the interpolator or filter is designed (e.g., degradation at a low vehicle speed). This degradation can be even worse in areas where very high vehicle speeds must be anticipated since the interpolator must be designed based on very high anticipated speeds which oftentimes will not be encountered.

The present invention is directed toward overcoming one or more of the problems set forth above.

SUMMARY OF THE INVENTION

In one aspect of the present invention, a mobile communication unit which is subjected to conditions which degrade the receipt of a signal is provided. The unit includes a receiver adapted to receive a signal having multiple symbols therein including predetermined pilot symbols, a processor adapted to demodulate received symbols based on an interpolator using the error in the received pilot symbols, and an output adapted to receive symbols demodulated using the interpolator which is best adapted to correctly demodulate selected ones of the received symbols under the conditions to which the communication unit is subjected when the symbols being demodulated are received. The processor selects that interpolator from at least two possible interpolators which is best adapted to correctly demodulate the received symbols under the conditions to which the communication unit is subjected when the symbols being demodulated are received.

In a preferred form of this aspect of the present invention, the received signals include error detection coding and an error detection decoder decodes the signal using the at least two interpolators with the processor selecting that interpolator which the decoder detects as having the least errors as the best adapted interpolator.

In another preferred form of this aspect of the present invention, the selected ones of the received symbols comprise less than half of the received symbols and, in one preferred form, the selected ones of the received symbols are from more than one data burst in the signal.

In still another preferred form of this aspect of the present invention, the mobile communication unit also includes memory maintaining at least two interpolators. In one alternate, the processor of this preferred form demodulates the selected ones of the received symbols using all of the at least two interpolators and selects that interpolator which has the least cumulative error in the demodulated symbols from discrete possible values of the symbols as the one best adapted to correctly demodulate the received symbols. In another alternate of this preferred form of this aspect of the present invention, the communication unit includes an estimator for determining the conditions to which the communication unit is subjected when the symbols that need to be demodulated are received, and the memory also stores information regarding the conditions under which each of the at least two interpolators is best adapted to correctly demodulate the received symbols. In a preferred form of this other alternate, the estimator is an algorithm estimating the Doppler shift of the unit, and the information in the memory is the range of Doppler shifts at which each of the at least two interpolators is best adapted to correctly demodulate the received symbols.

In another preferred form of this aspect of the present invention, the mobile communication unit includes memory storing a first algorithm for deriving any of a plurality of interpolators based on selected conditions to which the communication unit is subjected when symbols being demodulated are received, and also includes a sensor for determining the selected conditions to which the communication unit is subjected when the symbols being demodulated are received, with the processor using the selected conditions determined by the sensor to derive an interpolator from the algorithm. In a preferred form, one selected condition determined by the sensor is the Doppler shift and the first algorithm stored by the memory derives interpolators based on Doppler shift. In another preferred form, the sensor is a second algorithm for determining the Doppler shift and the first algorithm stored by the memory derives interpolators based on Doppler shift.

In another aspect of the present invention, a mobile unit is provided for communicating with a transmitter which transmits signals in data bursts, such data bursts having a plurality of symbols therein including data symbols and a plurality of predetermined pilot symbols. The symbols have a discrete number of possible values. The unit further includes a receiver adapted to receive a data burst of the transmitted signals, memory with the predetermined pilot symbols and a plurality of signal filters, a comparator, a processor, and an output. The comparator is adapted to compare the pilot symbols in a received data burst with the predetermined pilot symbols in the memory to determine channel estimates at the locations of the pilot symbols. The processor is adapted to use the pilot symbol channel estimates and the plurality of signal filters to derive a set of data symbol correction factors for each of the signal filters. The processor is adapted to adjust the discrete possible values of the data symbols by the data symbol correction factors and compare the adjusted data symbols with selected received data symbols to determine a cumulative error value among the selected received data symbols for each signal filter. The output is adapted to receive symbols demodulated by the processor using the interpolator having the lowest cumulative error value.

In a preferred form of this aspect of the present invention, the processor is adapted to measure an error as the difference between a selected received data symbol and the closest adjusted discrete possible value of the data symbols, and the cumulative error value for each signal filter is the sum of the squares of the absolute values of the error at each selected received data symbol.

In another preferred form of this aspect of the present invention, the cumulative error value is determined from selected received data symbols from more than one data burst.

In still another aspect of the present invention, a mobile unit is provided for communicating with a transmitter which transmits signals. The unit includes a receiver adapted to receive the transmitted signals, memory with a plurality of signal filters, the signal filters being selected to correct for selected Doppler shifts, an estimator estimating Doppler shift of the unit, and a demodulator responsive to the estimator for demodulating the transmitted signal as received by the receiver using the selected one of the signal filters which best corrects for the estimated Doppler shift.

In a preferred form of this aspect of the present invention, the estimator is an algorithm for estimating the Doppler shift of the unit.

In another preferred form of this aspect of the present invention, the estimator is a processor which for each signal filter compares selected symbols in the received signal with discrete possible values of the symbols adjusted by the each filter to determine an error figure for each signal filter, the estimated Doppler shift falling in a range of Doppler shifts best corrected by the signal filter having the smallest determined error figure.

In yet another aspect of the present invention, a method is provided for improving the signal reception of a mobile communication unit, including the steps of (a) transmitting a signal from a base station with data symbols having discrete possible values and pilot symbols with predetermined values at predetermined locations in the signal, (b) receiving the transmitted signal at the mobile communication unit, (c) deriving correction factors at the predetermined locations of the pilot symbols in the signal by comparing the symbols as received by the mobile communication unit with the predetermined values of the pilot symbols, (d) using a plurality of interpolators to interpolate corrections for the data symbols based on the correction factors from step (c), (e) correcting the data symbols using the interpolated corrections from step (d) and comparing the received data symbols to the adjusted discrete possible values for the data symbols to generate a cumulative error value for each interpolator, (f) selecting a set of data symbols which are the possible values closest to the corrected data symbols from the interpolator with the lowest cumulative error value, and (g) outputting the received signal using the selected data symbols.

In a preferred form of this aspect of the present invention, two interpolators are used in step (d), one interpolator being specially adapted to interpolate corrections for a communication unit traveling at high speeds and the other interpolator being specially adapted to interpolate corrections for a communication unit traveling at low speeds.

It is an object of the invention to provide mobile communication units such as cellular telephones which will provide maximum reliability and highest signal quality.

It is another object of the invention to provide mobile communication units which can demodulate high quality signals using current transmission standards.

DESCRIPTION OF THE PREFERRED EMBODIMENT

The preferred embodiments of the present invention are illustrated in the Figures.

Figure 1:
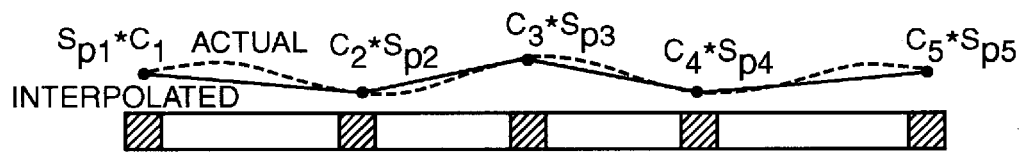
FIG. 1 is a schematic illustration of a data burst in a transmitted signal.

In the data burst 10 illustrated in FIG. 1, five pilot symbols $S_{P1}$, $S_{P2}$, $S_{P3}$, $S_{P4}$, $S_{P5}$ are provided at positions $P_1$, $P_2$, $P_3$, $P_4$ and $P_5$. Of course, more or less than five pilot symbols could also be used in a data burst. At each pilot position $P_i$, the pilot symbols $S_{Pi}$ may be one or more symbol. As an example, in the extensions of the IS-136 System, the number of symbols at positions $P_1$, $P_2$, $P_3$, $P_4$ and $P_5$ are 14. 3, 3, 3, and 3 respectively.

Figure 2:
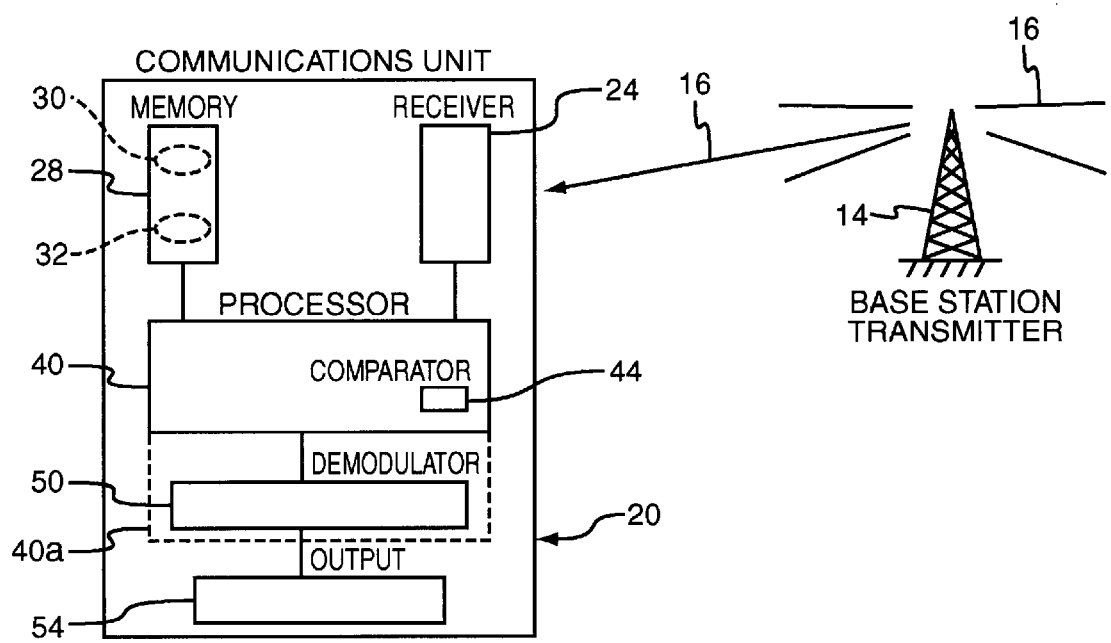
FIG. 2 is a schematic illustration of a communication system including a mobile communication unit embodying the present invention.

As illustrated in FIG. 2, a base station transmitter 14 transmits signals 16 which include data bursts 10 to receivers (for example, a mobile communication unit 20 such as a cellular telephone) at a selected frequency within a bandwidth appropriated for signals between the transmitter 14 and mobile communication unit 20.

In the prior art, the pilot symbols $S_{Pi}$ (where i is 1 to 5 in the FIG. 1 example) are used to correct for variations in channel conditions along the data burst 10. That is, known pilot symbols $S_{Pi}$ are provided at known positions within the data burst 10. The communication unit 20 compares the received symbol $R_{pi}$ which it receives at those known positions $P_i$ with the known symbols $S_{Pi}$ and determines an appropriate factor $C_{Pi}$ for each position $P_i$ to correct for that signal degradation. For example, if the symbol at $P_i$ is known to have been transmitted as $S_{Pi}$, and the communication unit actually receives $R_i$ at $P_i$, $C_{Pi}$ may be determined during synchronization so that:

$$\Sigma |R_{Pi} - C_{Pi}^* S_{Pi}|^2$$

is minimized. The $C_{Pi}$ determined for the selected positions $P_i$ along the data burst are then used to determine appropriate $C_{Pi}$ for all symbol positions along the data burst 10 by suitable interpolation.

Simple linear interpolation is schematically illustrated in FIG. 1. However, interpolation to determine appropriate correction factors $C_i$ for all data symbols $S_i$ between the pilot symbols $S_{Pi}$ is preferably done by use of an appropriate interpolator or Weiner filter such as is known in the art, and as explained in "Designs for Pilot-Symbol-Assisted Burst-Mode Communications with Fading and Frequency Uncertainty", by Wen-yi Kuo and Michael P. Fitz, *International Journal of Wireless Information Networks*, Vol. 1, No. 4, 1994, pp. 239–252, the complete disclosure of which is hereby fully incorporated by reference.

The interpolated $C_i$ at each symbol position along the data burst 10 is then used to demodulate the symbols in the burst 10. For example, at symbol 20 in the data burst, a factor $C_{20}$ is interpolated as discussed above. The proper symbol is then determined by calculating which signal $S_{20J}$ results in the least "metric" or error factor $m_{20}$ at position 20 according to the following:

$$m_{20} = |R_{20} - C_{20}^* S_{20J}|^2,$$

where:

$R_{20}$ is the symbol received at position 20; and $S_{20J}$ are the hypothetical possible symbols at position 20 (where, for example, there are four possible discrete values for symbols [i.e., four possible waveforms, J being 1 to 4] when modulation is QPSK [Quadrature Phase Shift Keying] and there are eight possible symbols [i.e., J is 1 to 8] when modulation is 8-PSK [8 Phase Shift Keying]).

According to one manner of prior art channel estimating, whichever of the discrete J number of symbols $S_{20J}$ gives the lowest $m_{20}$ is used as the most likely symbol for position 20, which symbol is used in demodulating the data burst 10.

In the preferred embodiment, the present invention also uses $C_{Pi}$ as determined at the positions $P_i$ of the pilot symbols and as interpolated therebetween ($C_i$ at each symbol position). However, it should be understood that the present invention could be used with different methods of determining $C_{Pi}$ at the pilot symbol positions $P_i$ and interpolating $C_i$ for the data symbols, and should not be limited to the methods of determining $C_{Pi}$, $C_i$ described herein for illustration purposes.

Most simply put, in accordance with the preferred embodiment of the present invention, the communication unit 20 includes a receiver 24 and memory 28 which stores not only the information regarding the pilot symbols $S_{Pi}$ but also stores multiple filters or interpolators 30, 32, such as Weiner filters. The mobile communication unit 10 also includes a suitable processor 40 for interpolating $C_i$ based on the symbols $R_{Pi}$ received at the pilot positions $P_i$ using each of the Weiner filters or other interpolators 30, 32 stored in the unit memory 28 as described further below. A comparator 44, which may be a part of the processor 40, compares the results of the processed data bursts 10 (as described below) to select the symbols to demodulate to provide the best signal quality in the unit 20.

The processor 40 further uses these correction factors $C_i$ to estimate the most likely value (of the discrete possible values) for each symbol, and also generates a "metric" or error factor $m_i$ such as previously described for each symbol $S_i$ in the data burst 10. These error factors are summed to generate a cumulative error value for each filter according to the following:

$$M_F = \sum_{i=1}^{N} m_{Fi},$$

where $M_F$ is the cumulative error value for filter F; and $m_{Fi}$ is the error factor at symbol $S_i$ for filter F, where there are N symbols, where, in accord with the previous discussion:

$$m_{Fi} = |R_i - C_{Fi}^* S_{iJ}|^2,$$

where:

$R_i$ is the symbol received at position i; and $S_{iJ}$ are the hypothetical possible symbols at position i, there being J possible discrete values for such symbols.

The comparator 44 compares those cumulative errors to essentially determine which cumulative error value $M_F$ is lowest. The filter 30 or 32 having the lowest cumulative error value $M_F$ is used to determine the appropriate symbols $S_i$ in the data burst 10, and those symbols are demodulated by a demodulator 50 to provide a high quality output signal at the output 54 such as a speaker in the communication unit 20 (the demodulator 50 may be separate as shown in the Figures, or may be a part of the processor 40, with the processor 40 doing the demodulation, as indicated by the dashed lines 40*a* in FIGS. 2–4 ). The calculation of the cumulative metric can be done at the locations of all data symbols in the slot or, preferably, only a subset of data positions in the data burst or slot (for example, at about 20 data positions).

In an alternative embodiment, the receiver accumulates the cumulative error across multiple slots and chooses the interpolator based on this accumulated value.

The data symbols are typically protected by some combination of error correction coding and error detection coding. In an alternative embodiment, the demodulated symbols obtained using the multiple interpolators are passed to the error detection decoder 56 (shown in phantom in Fig. 2)and the symbols with the least detected errors (of one slot or multiple slots) lead to the choice of the interpolation filter.

Figure 3:
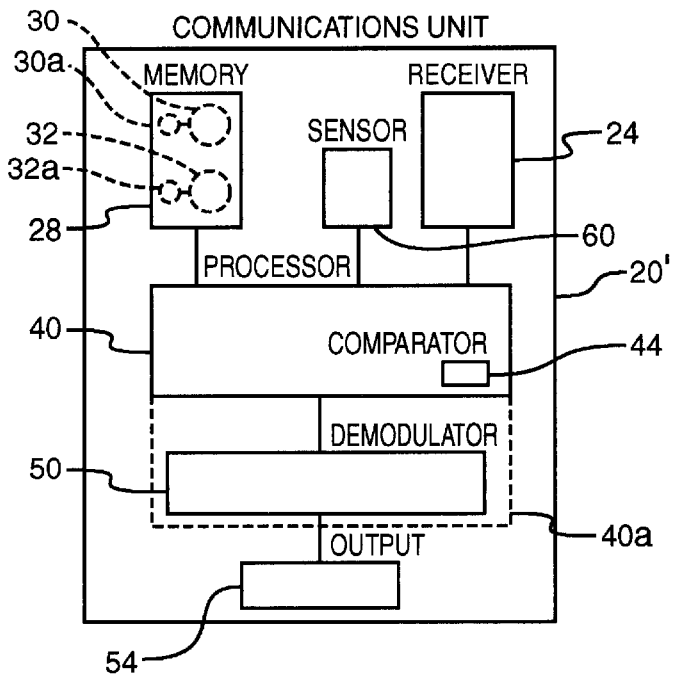
FIG. 3 is a schematic illustration of a mobile communication unit embodying an alternate embodiment of the present invention.

As another alternative embodiment shown in FIG. 3, rather than test each filter 30, 32 for a cumulative error value in accord with the above described preferred embodiment, the filters 30, 32 could be stored with information 30*a*, 32*a* that one filter 30 is best suited for use in certain conditions of the communication unit (e.g., low vehicle speeds) and the other filter 32 is best suited for use in other conditions (e.g., high vehicle speeds), and the unit 20 also includes a suitable sensor 60 for determining such conditions. Specifically, filters may be stored which are best suited for different ranges of Doppler shift, and the sensor 60 may be of a type which senses or estimates Doppler shift in the unit 20'. Manners of estimating Doppler shift such as may be used with the sensor 60 of this embodiment are shown in U.S. Pat. Nos. 4,723,303 and 5,016,017 and Taiwan Patent 59862, the complete disclosures of which are hereby fully incorporated by reference.

Figure 4:
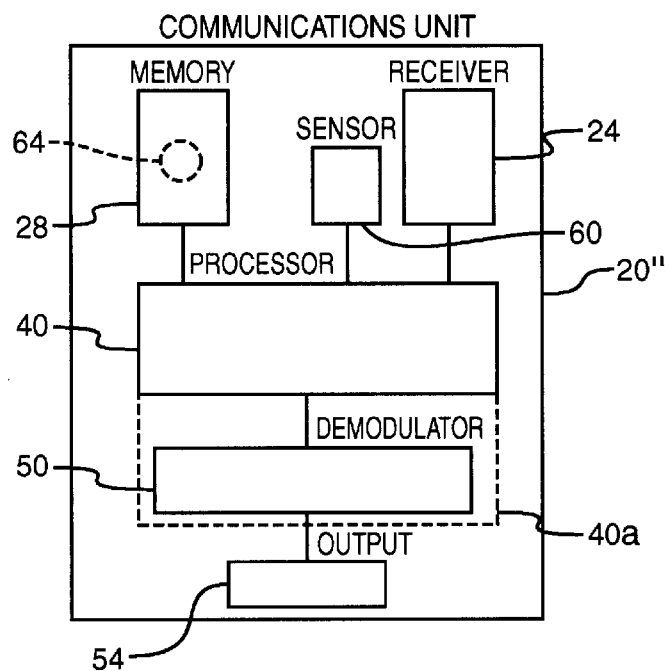
FIG. 4 is a schematic illustration of a mobile communication unit embodying another alternate embodiment of the present invention.

Yet another alternative to the FIG. 3 embodiment is illustrated in FIG. 4, in which a suitable algorithm 64 for developing an appropriate filter 30 is stored in the memory 28 of the unit 20" based on selected variables indicative of the condition of the unit 20" and which can be determined or estimated, such as Doppler shift. Such algorithms are known to those skilled in the art for developing, for example, Weiner filters, and exemplary algorithms are disclosed in "Designs for Pilot-Symbol-Assisted Burst-Mode Communications with Fading and Frequency Uncertainty", by Wen-yi Kuo and Michael P. Fitz, *International Journal of Wireless Information Networks*, Vol. 1, No. 4, 1994, pp. 239–252, the complete disclosure of which is hereby fully incorporated by reference. While such algorithms can require significant memory and processing speeds, such requirements are somewhat offset by eliminating the needs to store multiple filters and by also eliminating the need to process the signal multiple times (since, with this alternate, a single filter may be generated and used based on the unit conditions, as opposed to testing/comparing the signal against multiple filters as occurs with the above described preferred embodiment). Of course, as processing speeds and memory costs increase with technology, any drawbacks resulting from such requirements may be effectively eliminated.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A mobile communication unit comprising:
   a receiver adapted to receive a signal having one or more received symbols, the values of which are selected from a set of possible values;
   a memory for storing at least two interpolators;
   a processor for demodulating said received signal using said at least two interpolators to generate two or more estimates of the received symbols; and
   an error detection decoder to decode said two or more estimates of said received symbols and output a decoded signal corresponding to the estimate having the least errors.

2. A mobile communication unit comprising:
   a receiver adapted to receive a signal having one or more received symbols therein including predetermined pilot symbols;
   a memory maintaining at least two interpolators and storing information regarding the conditions under which each of the at least two interpolators is best adapted to correctly demodulate the received symbols;
   a processor adapted to demodulate all received symbols based on an interpolator using an error in the received pilot symbols, said processor selecting said interpolator from said at least two possible interpolators which is best adapted to correctly demodulate selected ones of the received symbols under the conditions to which the communication unit is subjected when the symbols being demodulated are received;
   an output adapted to receive symbols demodulated by the processor using the interpolator which is best adapted to correctly demodulate the selected ones of the received symbols under the conditions to which the communication unit is subjected when the symbols being demodulated are received; and
   an estimator for determining the conditions to which the communication unit is subjected when the symbols being demodulated are received.

3. The mobile communication unit of claim 2, wherein said estimator is an algorithm estimating the Doppler shift of the unit, and said information in said memory is the range of Doppler shifts at which each of the at least two interpolators is best adapted to correctly demodulate the received symbols.

4. A mobile communication unit comprising:
   a receiver adapted to receive a signal having one or more received symbols therein including predetermined pilot symbols;
   memory storing a first algorithm for deriving one of a plurality of interpolators based on selected conditions to which the communication unit is subjected when symbols being demodulated are received;
   a processor adapted to demodulate all received symbols based on a derived interpolator using an error in the received pilot symbols;
   a sensor for determining the sensed conditions to which the communication unit is subjected when the symbols being demodulated are received, said processor using said first algorithm to derive said interpolator based on the sensed conditions determined by the sensor; and an output adapted to receive symbols demodulated by the processor using the interpolator which is best adapted to correctly demodulate the selected ones of the received symbols under the conditions to which the communication unit is subjected when the symbols being demodulated are received.

5. The mobile communication unit of claim 4, wherein said selected conditions determined by said sensor is a Doppler shift and said first algorithm stored by said memory derives said interpolator based on said Doppler shift.

6. The mobile communication unit of claim 4, wherein said sensor is a second algorithm for determining a Doppler shift and said first algorithm stored by said memory derives said interpolator based on said Doppler shift.

7. A mobile unit for communicating with a transmitter which transmits signals in data bursts having a plurality of symbols therein including data symbols and a plurality of predetermined pilot symbols, said symbols having a discrete number of possible values, comprising:
  a receiver adapted to receive one of the data bursts of the transmitted signals; memory for storing said predetermined pilot symbols and a plurality of signal filters;
  a comparator adapted to compare the pilot symbols in a received data burst with the predetermined pilot symbols in the memory to determine channel estimates for the pilot symbols;
  a processor adapted to use said pilot symbol channel estimates and said plurality of signal filters to derive a set of data symbol correction factors for each of the signal filters, said processor also adapted to adjust said discrete possible values of the data symbols by said data symbol correction factors and compare said adjusted data symbols with selected received data symbols to determine a cumulative error value among the selected received data symbols for each signal filter; and
  an output adapted to receive symbols demodulated by the processor using the interpolator having the lowest cumulative error value.

8. The mobile unit of claim 7, wherein said processor is adapted to measure an error as the difference between a selected received data symbol and the closest adjusted discrete possible value of the data /symbols, and said cumulative error value for each signal filter is the sum of the squares of the absolute values of the error at each selected received data symbol.

9. The mobile unit of claim 7, wherein said cumulative error value is determined from selected received data symbols from more than one data burst.

10. A mobile unit for communicating with a transmitter which transmits signals, comprising:
  a receiver adapted to receive the transmitted signals;
  memory for storing a plurality of signal filters, each said signal filter adapted to correct for a selected Doppler shift;
  an estimator estimating Doppler shift of said mobile unit; and
  a demodulator responsive to the estimator for demodulating the transmitted signal as received by the receiver using a selected signal filter which best corrects for estimated Doppler shift.

11. The mobile unit of claim 10, wherein said estimator comprises an algorithm for estimating the Doppler shift of said unit.

12. A mobile unit for communicating with a transmitter which transmits signals, comprising:
  a receiver adapted to receive the transmitted signals;
  memory for storing a plurality of signal filters, each said signal filter adapted to correct for a selected Doppler shift;
  an estimator estimating Doppler shift of said unit; and
  a demodulator responsive to the estimator for demodulating the transmitted signal as received by the receiver using a selected signal filter which best corrects for the estimated Doppler shift;
  wherein said estimator comprises a processor which for each signal filter compares selected symbols in said received signal with discrete possible values of said symbols adjusted by said each filter to determine an error figure for each signal filter, said estimated Doppler shift falling in a range of Doppler shifts best corrected by the signal filter having the smallest determined error figure.

13. A method for improving signal reception of a mobile communication unit, comprising the steps of:
  (a) transmitting a signal from a base state with data symbols having discrete possible values and pilot symbols with predetermined values at predetermined locations in the signal;
  (b) receiving the transmitted signal at the mobile communication unit;
  (c) deriving correction factors at the predetermined locations of the pilot symbols in the signal by comparing the symbols as received by the mobile communication unit with the predetermined values of the pilot symbols;
  (d) using a plurality of interpolators to interpolate corrections for said data symbols based on the correction factors from step (c);
  (e) correcting said data symbols using the interpolated corrections from step (d) and comparing said corrected data symbols to the discrete possible values for said data symbols to generate a cumulative error value for each interpolator;
  (f) selecting a set of data symbols which are the possible values closest to the corrected data symbols from the interpolator with the lowest cumulative error value; and
  (g) outputting the received signal using the selected set of data symbols.

14. A method for improving signal reception of a mobile communication unit, comprising the steps of:
  (a) transmitting a signal from a base station with data symbols having discrete possible values and pilot symbols with predetermined values at predetermined location sin the signal;
  (b) receiving the transmitted signal at the mobile communication unit;
  (c) deriving correction factors at the predetermined locations of the pilot symbols in the signal by comparing the symbols as received by the mobile communication unit with the predetermined values of the pilot symbols;
  (d) using two interpolators to interpolate corrections for said data symbols based on the correction factors from step (c), one interpolator being specially adapted to interpolate corrections for a communication unit traveling at high speeds and the other interpolator being specially adapted to interpolate corrections for a communication unit traveling at low speeds;
  (e) correcting said data symbols using the interpolated corrections from step (d) and comparing said corrected data symbols to the discrete possible values for said data symbols to generate a cumulative error value for each interpolator;

(f) selecting a set of data symbols which are the possible values closest to the corrected data symbols from the interpolator with the lowest cumulative error value; and (g) outputting the received signal using the selected set of data symbols.

15. A mobile communication unit comprising:

a receiver adapted to receive a signal having one or more received symbols, the values of which are selected from a set of possible values;

a memory for storing at least two interpolators;

a processor to demodulate selected ones of said received symbols using said at least two interpolators and to select one of said interpolators that produces the least errors, said processor adapted to demodulate all received symbols based on the selected one of said at least two interpolators; and an output adapted to receive symbols demodulated by the processor using the selected one of said interpolators.

16. The mobile communication unit of claim 15, wherein said selected ones of the received symbols comprise less than half of said received symbols.

17. The mobile communication unit of claim 16, wherein said selected ones of the received symbols are from more than one data burst in said signal.

* * * * *